(12) United States Patent
Heck et al.

(10) Patent No.: US 11,945,599 B2
(45) Date of Patent: Apr. 2, 2024

(54) FLOW BODY FOR AN AIRCRAFT WITH INTEGRATED GAS TANK

(71) Applicant: Airbus Operations GmbH, Hamburg (DE)

(72) Inventors: Christian Heck, Hamburg (DE); Shekhar Inamdar, Hamburg (DE)

(73) Assignee: Airbus Operations GmbH, Hamburg (DE)

( * ) Notice: Subject to any disclaimer, the term of this patent is extended or adjusted under 35 U.S.C. 154(b) by 0 days.

(21) Appl. No.: 17/690,329

(22) Filed: Mar. 9, 2022

(65) Prior Publication Data

US 2022/0289401 A1 Sep. 15, 2022

(30) Foreign Application Priority Data

Mar. 9, 2021 (DE) ..................... 10 2021 105 609.8

(51) Int. Cl.
*B64D 37/06* (2006.01)
*B64C 5/00* (2006.01)
*B64D 37/30* (2006.01)

(52) U.S. Cl.
CPC ............... *B64D 37/06* (2013.01); *B64C 5/00* (2013.01); *B64D 37/30* (2013.01)

(58) Field of Classification Search
CPC ............................... B64D 37/06; B64D 37/30
See application file for complete search history.

(56) References Cited

U.S. PATENT DOCUMENTS

| | | | | | |
|---|---|---|---|---|---|
| 3,659,817 | A | * | 5/1972 | Hendal | B63B 25/12 248/901 |
| 4,448,372 | A | * | 5/1984 | Larson | B64C 1/26 244/119 |
| 2008/0013246 | A1 | * | 1/2008 | Berenguer Monge | F16L 25/026 361/215 |
| 2013/0240671 | A1 | * | 9/2013 | Kruse | B64C 3/187 403/150 |

(Continued)

FOREIGN PATENT DOCUMENTS

| | | |
|---|---|---|
| CN | 106 628 114 B | 5/2017 |
| DE | 102011116841 A1 | 4/2013 |

(Continued)

OTHER PUBLICATIONS

European Search Report for U.S. Appl. No. 22/157,774 dated Jul. 7, 2022.

(Continued)

*Primary Examiner* — Philip J Bonzell
*Assistant Examiner* — Ashesh Dangol
(74) *Attorney, Agent, or Firm* — KDW Firm PLLC

(57) ABSTRACT

A flow body for an aircraft includes a torsion box with spars and/or ribs and at least two skin portions for enveloping the spars and/or ribs, wherein at least one inner cell is formed in the torsion box. It is provided that a gas tank with a gas tank shell is arranged in the at least one inner cell, and that the gas tank includes fastening elements coupled to retaining elements in the relevant inner cell in order to hold the gas tank such that the gas tank shell is supported at a distance from the spars and/or ribs and the skin portions and is supported in three spatial directions.

20 Claims, 3 Drawing Sheets

(56) References Cited

U.S. PATENT DOCUMENTS

| | | | | |
|---|---|---|---|---|
| 2014/0339367 | A1* | 11/2014 | Sankrithi | ............... B64C 39/00 244/135 R |
| 2015/0069184 | A1 | 3/2015 | Barmichev et al. | |
| 2017/0081039 | A1 | 3/2017 | Martindale et al. | |
| 2018/0009525 | A1* | 1/2018 | Keegan | .................... B64C 3/38 |

FOREIGN PATENT DOCUMENTS

| | | |
|---|---|---|
| DE | 102019126287 B3 | 1/2021 |
| EP | 2 639 152 A2 | 9/2013 |

OTHER PUBLICATIONS

German Search Report for Application No. 102021105609 dated Oct. 19, 2021.

* cited by examiner

FLOW BODY FOR AN AIRCRAFT WITH INTEGRATED GAS TANK

CROSS-REFERENCE TO RELATED APPLICATION

This application claims priority to German patent application DE 10 2021 105 609.8 filed Mar. 9, 2021, the entire disclosure of which is incorporated by reference herein.

TECHNICAL FIELD

The disclosure herein relates to a flow body for an aircraft and to an aircraft having at least one such flow body.

BACKGROUND

Fuel cells, which require the supply of a fuel, in particular hydrogen or a gas containing hydrogen, can be used to supply aircraft with electrical power. The fuel can be produced by reforming from another fuel or can be provided from a hydrogen tank. The latter could be designed to hold gaseous or liquid hydrogen.

DE 10 2011 116 841 A1 describes an aircraft which has a fuel cell and a water electrolysis unit. It further has a tubular gas-tight wing spar in which an oxygen tank and a hydrogen tank are arranged and which, when filled, forms an additional stiffening of the wing in the wingspan direction. The wing spar can have an inner tube which absorbs an internal pressure of the hydrogen or oxygen as well as tensile and compressive forces from the wing bending moment and the wing compressive forces attributable to the surface portion on the spar.

DE 10 2019 126 287 B3 discloses a fluid tank for integration into a structure of an unmanned aerial vehicle, comprising a shell having a first axial wall, an oppositely disposed second axial wall, an upper face, a lower face, and an enclosed interior, at least one receiving chamber in the interior for storing fluid, and a collection chamber disposed on the lower face and in fluid communication with the at least one receiving chamber, wherein the collection chamber has a bottom surface through which a drain extends, and a covering surface disposed above the bottom surface and covering at least a portion of the collection chamber.

SUMMARY

An object of the disclosure herein is to provide an alternative device for carrying fuel and, in particular, hydrogen in an aircraft.

The object is achieved by a flow body for an aircraft having features disclosed herein. Advantageous embodiments and further developments are to be taken from the following description.

A flow body for an aircraft is proposed, comprising a torsion box having a plurality of spars and/or ribs and at least two skin portions for enveloping the spars and/or ribs, wherein at least one inner cell is formed in the torsion box. It is provided that a gas tank with a gas tank shell is arranged in the at least one inner cell, and that the gas tank comprises fastening elements coupled to retaining elements in the relevant inner cell in order to hold the gas tank such that the gas tank shell is supported at a distance from the spars and/or ribs and the skin portions and is supported in three spatial directions.

The torsion box is a box-shaped, largely hollow structure, which can represent a core component of the flow body. During operation of the flow body, the torsion box is subjected in particular to torsion and bending loads and can particularly preferably have a plurality of, i.e. at least two, spars. Multi-spar designs are particularly advantageous in this respect. Between the spars, which are spaced apart from one another, a plurality of ribs could be arranged if necessary. This can result in a lamellar or lattice-like structure, which is enveloped by the skin portions. The spars, ribs and skin portions are attached to each other so that the torsion box has a particularly high rigidity. Such a torsion box is known, for example, as a wing box, which may also be present in vertical stabilizers, horizontal stabilizers, winglets, leading-edge slats and other elements.

Due to the aforementioned box-shaped structure, which consists of stiffening elements spaced apart from one another, individual inner cells are formed in the torsion box. In accordance with the disclosure herein, a gas tank with a gas tank shell is arranged in at least one such inner cell and is designed to receive a gas and to release it again as required. The size and shape of the individual inner cells follows the design of the torsion box, which is primarily designed to achieve a desired, aerodynamic surface area. The inner cell, i.e. the cavity itself, often serves no other purpose. In vertical stabilizers, it is possible that actuators, electrical lines, fluid lines, or shafts might pass through inner cells. In accordance with the disclosure herein, at least one of these hollow inner cells is now equipped with a gas tank, so that particularly good use is made of the available installation space within the flow body and the aircraft.

In order to prevent the gas tank from damaging the flow body during operation of the aircraft or from repeatedly coming into contact with an inner boundary surface of the relevant inner cell due to inertial forces caused by accelerations of the aircraft, a fastening is provided. This is realized by the fastening elements arranged on the gas tank. The fastening elements could be arranged directly on the gas tank shell or fastened to flanges, which in turn are arranged on the gas tank shell. The fastening elements are coupled to retaining elements in the relevant inner cell so that the gas tank is retained thereon. By providing a sufficient distance to the spars and/or ribs as well as to the skin portions, contact can be ruled out. The distance additionally supports thermal insulation, which is particularly advantageous for cooled and especially cryogenic media in the gas tank. Due to the usually spatial movement of the flow body, it is expedient to support the relevant gas tank in all three spatial directions. The fastening should be designed here in such a way that the expected or approval-related accelerations are taken into account.

In an advantageous embodiment, the gas tank is a pressurized gas tank. Consequently, the gas tank can be filled with a pressurized gas. The gas tank could resemble a conventional pressurized gas tank having an ideally round or at least rounded shape. However, the design possibility of a pressurized tank depends on the design of the at least one inner cell. For example, if the inner cells tend to be narrow and elongate, then tubular pressure tanks with round end-face caps at the ends could be suitable.

In a particularly advantageous embodiment, the gas tank is designed to store liquid hydrogen. For this purpose, it is preferred that the gas tank has sufficient thermal insulation for the cryogenic storage of hydrogen. For this purpose, the gas tank can have an arrangement of a plurality of gas tank shells, which together delay a heat input into the gas tank. Various insulating layers between successive gas tank shells may be considered for implementing such insulation and may include vacuum insulation, foams, and others.

Particularly preferably, the flow body has a plurality of inner cells, in which a plurality of independent gas tanks are arranged. Depending on the design of the flow body, the inner cells are not of arbitrary size and therefore cannot accommodate gas tanks of arbitrary size. To provide mechanical strength, a plurality of spars or ribs can be provided internally to subdivide the volume enclosed by the torsion box. Therefore, if there is a need for a larger gas volume or a larger gas mass than can be accommodated in a gas tank in one of the inner cells, a plurality of inner cells can consequently each be provided with a gas tank. It is not absolutely necessary to make the gas tanks identical. If the inner cells have different dimensions, gas tanks can also be designed to match them. By a line system with connectors, valves, a manifold or the like, the plurality of gas tanks can supply the gas contained therein to a single line or can be filled through a single line.

In an advantageous embodiment, the fastening elements are arranged on or coupled to the gas tank shell, wherein the fastening elements comprise tension elements connected to the retaining elements. It is conceivable that the fastening elements are arranged on different portions and different sides of a gas tank, such that a stable support as well as a consistent orientation of the gas tank is made possible. The retaining elements could be arranged on stiffening components, for example spars and/or ribs and/or skin portions. For strength reasons, it may be convenient to arrange the retaining elements near intersections of stiffening elements. Since a gas tank is spaced apart from all structural components forming an inner cell, tension elements may bridge the distance between the fastening elements and the retaining elements. The tension elements may further comprise bracing means by which all tension elements coupled to a gas tank are firmly braced and do not sag. Thus, the gas tank is tightly suspended in the corresponding inner cell. This suspension can also compensate for different thermal expansions of the gas tank and the stiffening elements.

In a particularly advantageous embodiment, the tension elements are arranged symmetrically around at least one extension axis of the gas tank. Such an extension axis could, for example, be a longitudinal axis around which the individual tension elements are arranged symmetrically. The load on the tension elements can then be distributed evenly over all tension elements.

The gas tank could have an elongate shape, wherein a main extension axis runs parallel or angularly symmetrically to longitudinal stiffening elements arranged at the skin portions. For example, an inner cell could have two spaced-apart spars or two spaced-apart ribs, between which the relevant gas tank extends with its longitudinal axis. If the two longitudinal stiffening elements run parallel to each other, the main extension axis of the gas tank could also run parallel hereto. If the two longitudinal stiffening elements form an angle relative to each other, the main extension axis could enclose the same angle value relative to each longitudinal stiffening element.

Particularly preferably, the at least one inner cell is bounded by at least two spaced-apart spars and the skin portions. Consequently, a plurality of inner cells may each be bounded by spaced-apart spars between which a gas tank extends.

It is advantageous if the gas tank comprises first fastening elements and second fastening elements coupled to retaining elements in the relevant inner cell, wherein the first fastening elements and the second fastening elements are attached to two spaced-apart portions of the gas tank and are designed to be supported in different spatial directions. This could be used, for example, to absorb longitudinal and transverse acceleration of the aircraft on which the flow body is arranged with dedicated first fastening elements. Vertical accelerations, meanwhile, could be absorbed by second fastening elements. The vertical acceleration could be intercepted centrally at the gas tank, while the longitudinal and transverse accelerations could be intercepted at opposite end portions. However, other variants are also conceivable in which the fastening elements are arranged in reverse to this or in which other combinations of acceleration components are taken into account.

The torsion box may have two, three, or more planar box portions forming the torsion box when arranged adjacently in a row, wherein each of the box portions has a plurality of inner cells formed therein, wherein each box portion has at least one group of gas tanks disposed in the relevant inner cells. Consequently, a plurality of levels of a plurality of gas tanks could be arranged side-by-side in a torsion box to create a larger arrangement of gas tanks. Larger, more complex torsion boxes could thus be usefully filled by larger flow bodies. The flow body could be a vertical stabilizer or a horizontal stabilizer of an aircraft. In particular, the vertical stabilizer can be suitable for the concept according to the disclosure herein, since a plurality of hollow inner cells are found there, which can be used expediently by equipping them with gas tanks.

The disclosure herein further relates to an aircraft comprising at least one flow body according to the above description.

BRIEF DESCRIPTION OF THE DRAWINGS

Further features, advantages and possible applications of the disclosure herein will become apparent from the following description of the example embodiments and the figures. Here, all the features described and/or illustrated constitute the subject of the disclosure herein in themselves and in any combination, also irrespective of their composition in the individual claims or the back-references of the latter. Furthermore, in the figures, like reference signs are used for like or similar objects.

DETAILED DESCRIPTION

Figure 1:
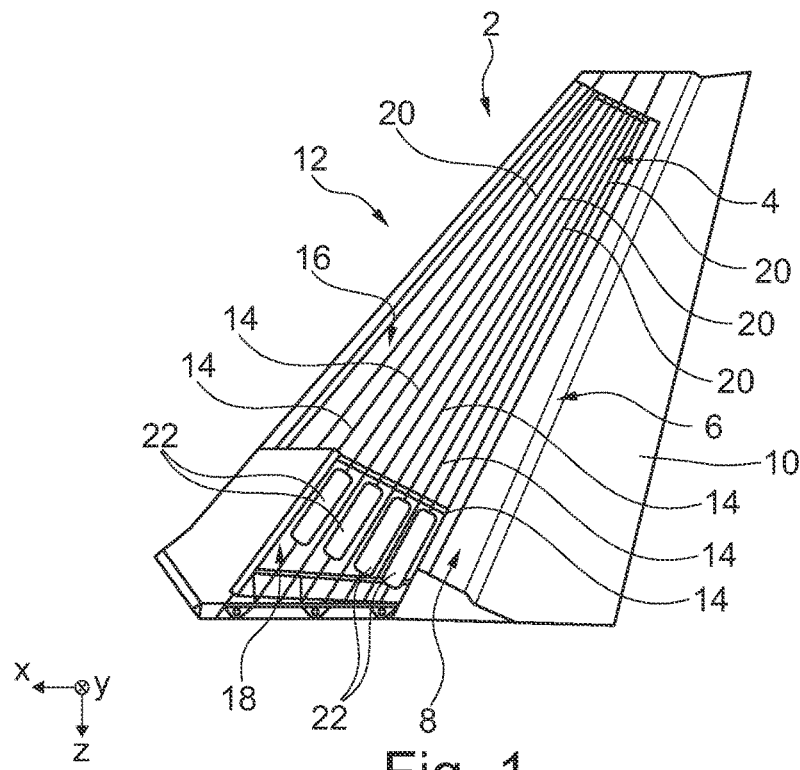
FIG. 1 shows a flow body as a vertical stabilizer in a partially cut side view.

FIG. 1 shows a flow body in the form of a vertical stabilizer 2. For orientation purposes, a coordinate system showing a longitudinal axis X, a lateral axis Y and a vertical axis Z of an aircraft on which the vertical stabilizer 2 is arranged is shown.

A torsion box 4 is a central, load-bearing component of the flow body 2. A hinge 8 is arranged on the trailing edge 6 of the flow body 2, by which hinge a rudder 10 is movably mounted. A leading edge 12 is provided on an opposite side. The torsion box 4 has a plurality of spars 14 extending between the leading edge 12 and the trailing edge 6 with an upwardly decreasing spacing. A first skin portion 16 (partially obscured in the drawing plane by the spars 14) and a second skin portion (omitted in this view) are disposed on the spars 14 and close the torsion box 4. This results in a plurality of inner cells 18. It is conceivable that the inner cells 18 may be divided in places by ribs (not shown here). Longitudinal stiffening elements in the form of stringers 20 are also arranged on the skin portions 16.

At a lower end of the flow body 2, four gas tanks 22 are visible, which are arranged in separate inner cells 18 and are designed to store a gas. In particular, this may be hydrogen. The gas tanks 22, by way of example, can be designed to store liquid hydrogen cryogenically.

Figure 2:
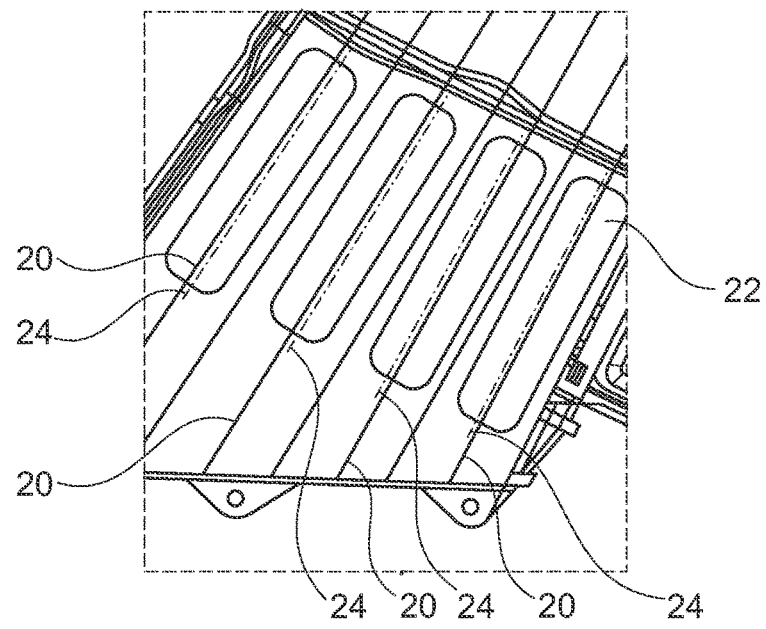
FIG. 2 shows an enlargement of the view in FIG. 1.

FIG. 2 shows an enlarged view of the arrangement of the gas tanks 22. It can be seen that the gas tanks 22 are elongate or tubular and have rounded end caps. They each have a main extension axis 24, which may represent a longitudinal axis, which runs substantially parallel to the stringers 20.

Figure 3:
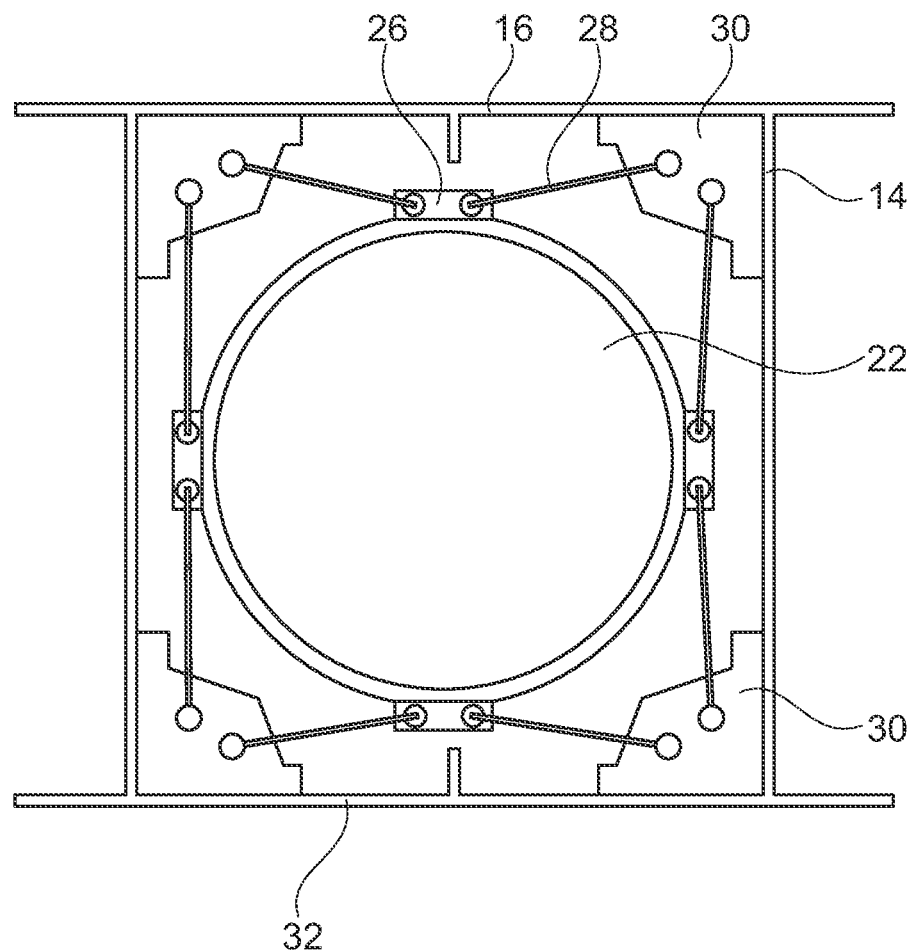
FIG. 3 shows a plan view of a gas tank in an inner cell.

FIG. 3 shows a plan view of a plane perpendicular to the extension axis 24 of a gas tank 22. The gas tank 22 has fastening elements 26 that are coupled to retaining elements 30 via tension elements 28. As will be explained further below, these fastening elements 26 are also referred to as second fastening elements. The retaining elements 30 may be positioned at intersections between spars 14 and the first skin portion 16 or an oppositely disposed second skin portion 32, where they are connected to the spars 14 and the skin portions 16 and 32. The tension elements 28 are configured to brace the gas tank 22 against the retaining elements 30. For this purpose, four second fastening elements 26 by way of example are distributed regularly and symmetrically around the longitudinal extension axis 24 along the circumference of the gas tank 22. The tension elements 28 can further be designed to achieve a damping effect by selection of a suitable material and a corresponding stretching behavior.

Figure 4:
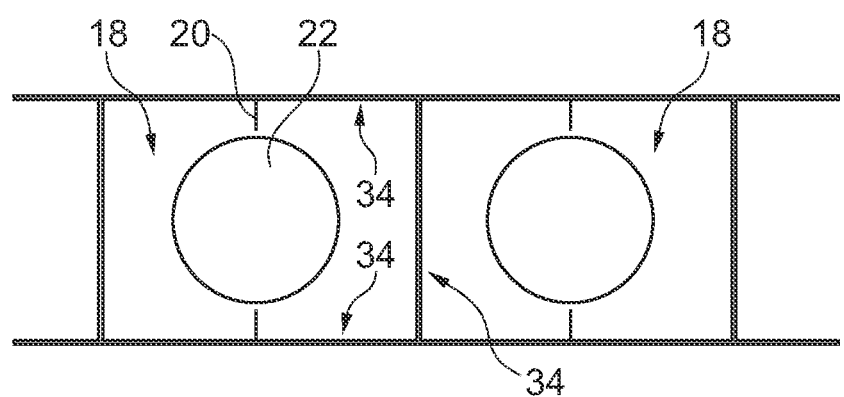
FIG. 4 shows two gas tanks in two adjacent inner cells.

A plurality of gas tanks 22 in adjacent inner cells 18 are shown in FIG. 4. Here, it can be seen that the gas tanks 22 are spaced a certain distance from inner surfaces 34 of the inner cell 18. This can prevent damage caused by the gas tanks 22 striking against the inner surfaces 34. At the same time, heat input into the gas tanks 22 could be reduced, particularly when cryogenic gas tanks 22 are used.

Figure 5:
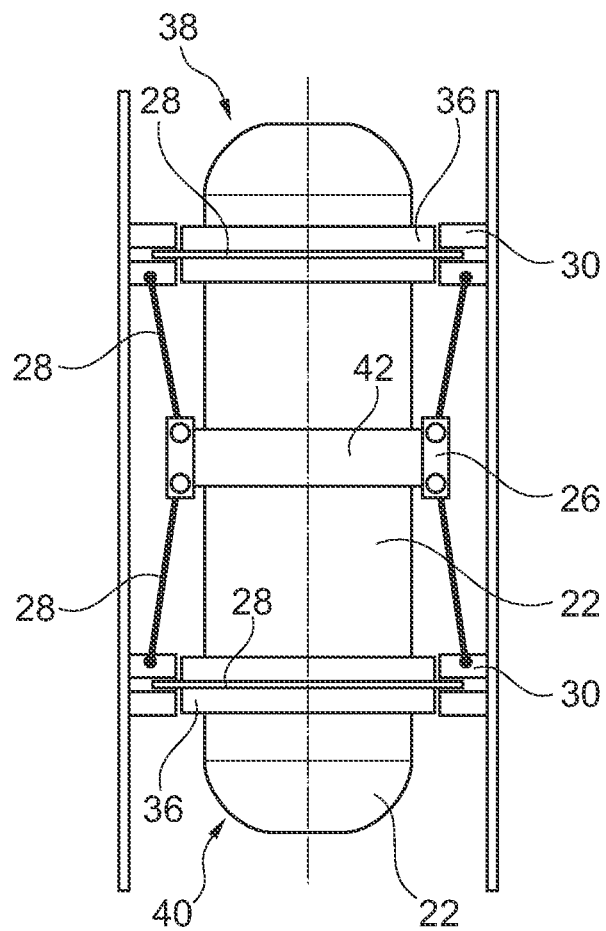
FIG. 5 shows a front view of a gas tank in an inner cell.

FIG. 5 shows the gas tank 22 in a front view approximately perpendicular to a spar 14. Here, first fastening elements 36 are visible, which are coupled to the retaining elements 30 by the tension elements 28 and fix the gas tank 22 substantially in the X and Y direction. The first fastening elements 36 are found both at an upper first end portion 38 of the gas tank 22, and at a lower second end portion 40 of the gas tank 22. By way of example, they are annular in shape and may include eyelets, flanges, or other means to permit fastening of the tension elements 28. Similarly, the retaining elements 30 are arranged laterally adjacent to the first fastening elements 36. The second fastening elements 26 are arranged centrally between the first end portion 38 and the second end portion 40 and are likewise braced with the retaining elements 30 via tension elements 28. They can also have an annular structure 42, via which they are connected to the gas tank 22. This can be used in particular for fixing in the Z direction.

Figure 6:
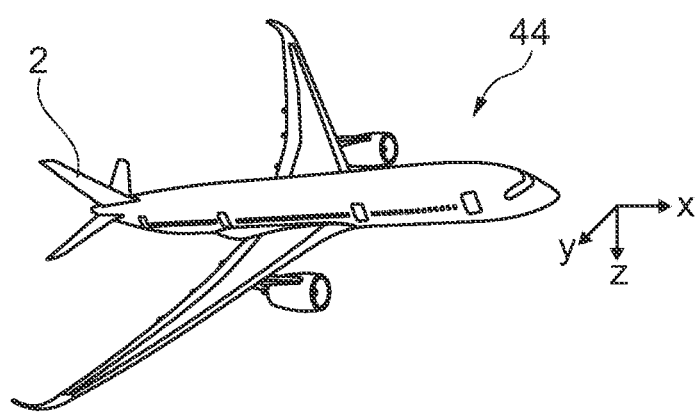
FIG. 6 shows an aircraft with a vertical stabilizer designed in accordance with the disclosure herein.

Lastly, FIG. 6 shows an aircraft 44, which has a vertical stabilizer 2 designed according to the principles presented above.

It should additionally be noted that "comprising" does not exclude other elements or steps, and "a" or "one" does not exclude a plurality. Further, it should be noted that features that have been described with reference to any of the above example embodiments may also be used in combination with other features of other example embodiments described above. Reference signs in the claims are not to be considered as a limitation.

While at least one example embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the example embodiment(s). In addition, in this disclosure, the terms "comprise" or "comprising" do not exclude other elements or steps, the terms "a", "an" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

REFERENCE SIGNS 2 flow body/vertical stabilizer
4 torsion box
6 trailing edge
8 hinge
10 rudder
12 leading edge
14 spar
16 first skin portion
18 inner cell
20 stringer
22 gas tank
24 main extension axis
26 second fastening element
28 tension element
30 retaining element
32 second skin portion
34 inner surface
36 first fastening element
38 first end portion
40 second end portion
42 annular structure

The invention claimed is:

1. A vertical stabilizer for an aircraft, the vertical stabilizer comprising:
a torsion box comprising:
a plurality of spars and/or ribs, each spar and/or rib of the plurality of spars and/or ribs extending towards a tip of the vertical stabilizer, transverse to a chord direction of the vertical stabilizer;
at least two skin portions for enveloping the spars and/or ribs; and
a plurality of inner cells that each extend towards the tip of the vertical stabilizer, wherein each inner cell of the plurality of inner cells:
is between laterally adjacent spars and/or ribs of the plurality of spars and/or ribs;
is spaced apart from other inner cells of the plurality of inner cells in the chord direction of the vertical stabilizer; and
comprises:
retaining elements;
a gas tank with a gas tank shell, the gas tank comprising fastening elements;
wherein the fastening elements are coupled to the retaining elements in a corresponding inner cell of the plurality of inner cells in which the gas tank is located to hold the gas tank such that:
the gas tank shell is supported at a distance from the at least two skin portions and the laterally adjacent spars and/or ribs between which the gas tank shell is located; and
the gas tank shell is supported in three spatial directions;
wherein the plurality of inner cells are formed in the torsion box.

2. The vertical stabilizer of claim 1, wherein the gas tank is a pressurized gas tank.

3. The vertical stabilizer of claim 1, wherein the gas tank is configured to store liquid hydrogen.

4. The vertical stabilizer of claim 1, wherein the gas tank in each of the plurality of inner cells is independent of the gas tank in all other inner cells of the plurality of inner cells.

5. The vertical stabilizer of claim 1, wherein:
the fastening elements are arranged on or coupled to the gas tank shell, and
the fastening elements comprise tension elements which are connected to the retaining elements.

6. The vertical stabilizer of claim 5, wherein the tension elements are arranged symmetrically about at least one extension axis of the gas tank.

7. The vertical stabilizer of claim 1, wherein the gas tank has an elongate shape and a main extension axis that runs parallel or angularly symmetrically to longitudinal stiffening elements that are arranged at the at least two skin portions.

8. The vertical stabilizer of claim 1, wherein the plurality of inner cells are bounded at least by the at least two skin sections and two spaced-apart spars of the plurality of spars and/or ribs.

9. The vertical stabilizer of claim 1, wherein:
the fastening elements of the gas tank comprise first fastening elements and second fastening elements that are coupled to retaining elements in the corresponding inner cell of the plurality of inner cells; and
the first fastening elements and the second fastening elements are attached, respectively, to two spaced-apart longitudinal portions of the gas tank and are configured to support the gas tank shell in different spatial directions.

10. The vertical stabilizer of claim 1, wherein:
the torsion box comprises a first planar box portion and a second planar box portion, the first and second planar box portions being arranged adjacently in a row to form the torsion box;
the plurality of inner cells comprises a first plurality of inner cells and a second plurality of inner cells;
the first plurality of inner cells is formed in the first planar box portion;
the second plurality of inner cells is formed in the second planar box portion;
the gas tank in each inner cell of the first plurality of inner cells in the first planar box portion forms a part of a respective first group of gas tanks; and
the gas tank in each inner cell of the second plurality of inner cells in the second planar box portion forms a part of a respective second group of gas tanks.

11. The flow body of claim 1, wherein each inner cell of the plurality of inner cells is spaced apart from each other in the chord direction by one of the spars and/or ribs of the plurality of spars and/or ribs.

12. An aircraft comprising at least one vertical stabilizer of claim 1.

13. The vertical stabilizer of claim 1, wherein:
the torsion box comprises first, second, and third planar box portions that are respectively arranged adjacently to each other in a row to form the torsion box;
the plurality of inner cells comprises:
a first plurality of inner cells formed in the first planar box portion;
a second plurality of inner cells formed in the second planar box portion; and
a third plurality of inner cells formed in the third planar box portion;
the gas tank in each inner cell of the first plurality of inner cells forms a part of a respective first group of gas tanks;
the gas tank in each inner cell of the second plurality of inner cells forms a part of a respective second group of gas tanks; and
the gas tank in each inner cell of the third plurality of inner cells forms a part of a respective third group of gas tanks.

14. The vertical stabilizer of claim 1, wherein:
the torsion box comprises at least first, second, third, and fourth planar box portions that are respectively arranged adjacently to each other in a row to form the torsion box;
the plurality of inner cells comprises:
a first plurality of inner cells formed in the first planar box portion;
a second plurality of inner cells formed in the second planar box portion;
a third plurality of inner cells formed in the third planar box portion; and
a fourth plurality of inner cells formed in the fourth planar box portion;
the gas tank in each inner cell of the first plurality of inner cells forms a part of a respective first group of gas tanks;
the gas tank in each inner cell of the second plurality of inner cells forms a part of a respective second group of gas tanks;
the gas tank in each inner cell of the third plurality of inner cells forms a part of a respective third group of gas tanks; and
the gas tank in each inner cell of the fourth plurality of inner cells forms a part of a respective fourth group of gas tanks.

15. The vertical stabilizer of claim 1, wherein the retaining elements are positioned where one of the at least two skin portions intersects one of the plurality of spars and/or ribs.

16. The vertical stabilizer of claim 5, wherein the tension elements extend between and interconnect one of the fastening elements with one of the retaining elements.

17. The vertical stabilizer of claim 16, wherein the retaining elements and the fastening elements are spaced apart from each other within each of the one or more inner cells.

18. The vertical stabilizer of claim 17, wherein the tension elements are elongate.

19. The vertical stabilizer of claim 9, wherein:
a first portion of the first fastening elements are attached to the gas tank at a first end of the gas tank;
a second portion of the first fastening elements are attached to the gas tank at a second end of the gas tank, the second end of the gas tank being opposite from the first end of the gas tank;
a first portion of the retaining elements are arranged laterally adjacent to the first portion of the first fastening elements at the first end of the gas tank;

a second portion of the retaining elements are arranged laterally adjacent to the second portion of the first fastening elements, at the second end of the gas tank; and the second fastening elements are arranged centrally between the first end of the gas tank and the second end of the gas tank, each of the second fastening elements being attached to both one of the first portion of the retaining elements and one of the second portion of the retaining elements.

20. The vertical stabilizer of claim 19, wherein the second fastening elements are attached to the gas tank by an annular structure that is provided around the gas tank and arranged centrally between the first end of the gas tank and the second end of the gas tank.

\* \* \* \* \*